B. E. BREITWEISER.
DETACHABLE TIRE PROTECTOR.
APPLICATION FILED OCT. 19, 1920.
1,393,196.
Patented Oct. 11, 1921.
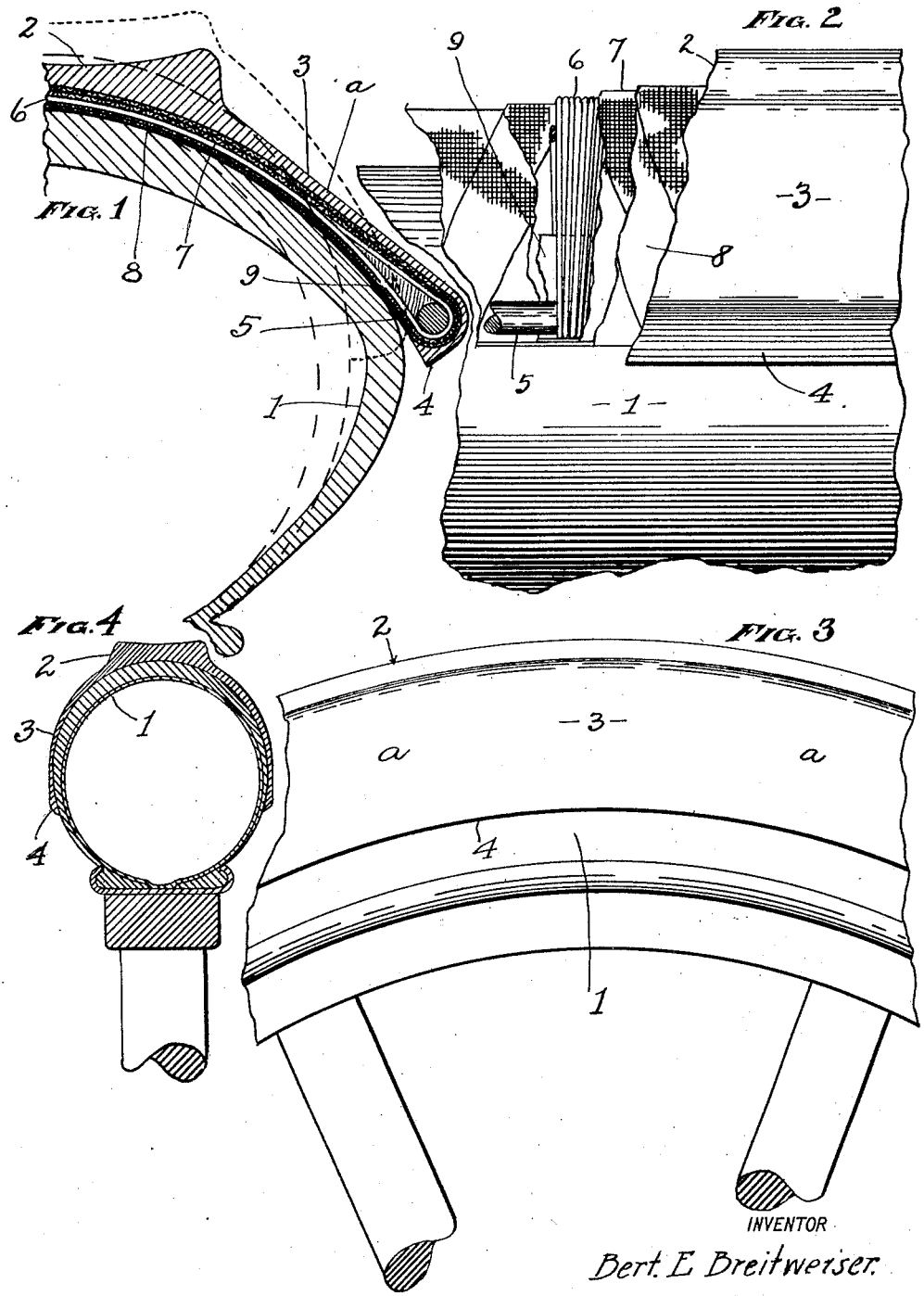
INVENTOR
Bert. E. Breitweiser.
BY
U. G. Charles
ATTORNEY

UNITED STATES PATENT OFFICE.

BERT E. BREITWEISER, OF WICHITA, KANSAS.

DETACHABLE TIRE-PROTECTOR.

1,393,196.  Specification of Letters Patent.  Patented Oct. 11, 1921.

Application filed October 19, 1920. Serial No. 418,090.

*To all whom it may concern:*

Be it known that I, BERT E. BREITWEISER, a citizen of the United States, and resident of Wichita, in the county of Sedgwick and State of Kansas, have invented certain new and useful Improvements in Detachable Tire-Protectors, of which the following is a specification.

This invention relates to detachable protectors for pneumatic tires, for the purpose of taking the wear of the road from the tire itself. Essentially my improved tire-protector consists of an annular shoe composed of rubber, fabric and wire vulcanized together, the edges of the shoe having beads in which are embedded ring-wires whose diameter is less than that of the tread of the shoe. The wire portion of the shoe also comprises a single wrapped or wound wire which is looped around the ring-wires alternately.

In the accompanying drawing, Figure 1 is a half transverse section of the protector and a tire to which it is to be applied; Fig. 2 shows the same tire in side elevation and the protector in elevation with its elements broken away to show construction; Fig. 3 is a side elevation of a portion of the device in position on a fully inflated tire; and Fig. 4 is a sectional diagram showing the relation of the shoe to the inflated tire.

Referring more in detail to the parts:—

1 indicates a portion of any pneumatic tire; 2 indicates the tread portion of my tire protector, and 3, the side walls thereof. These portions are made of tire-rubber.

The sectional form of the protector when detached, is curved, as shown on Fig. 1, on an arc of longer radius than that of the tire's curvature—the latter being shown by broken lines. The tread 2 is made of any desired thickness, and preferably is dished transversely as shown, to reduce side-slipping on slippery pavements.

The shoe is increased in thickness gradually from a point $a$ outward to its edge, thus forming a heavy bead 4 on each side of the shoe.

Embedded in each bead 4 is an annular ring-wire 5. The diameter of each ring-wire is less than the median diameter of the shoe.

In the manufacture of the device, the two ring-wires are clamped in proper relative positions, and a pair of rubber rings 9 are placed in contact with the respective ring-wires. The position of one rubber ring is clearly shown in Fig. 1. Next, a piano-wire 6 is wound around the ring-wires as closely as possible, around the whole circumference of the ring, and its ends united. Next, a fabric-and-rubber strip 7 is wrapped spirally around the wire 6, completely around the ring, the edges of the strip being lapped. A second fabric-and-rubber strip 8 is wrapped spirally around the inner strip 7, covering the same, and its edges are lapped. The rubber body 2—3 is molded about the fabric strips, and finally the whole is vulcanized. The rubber of the strips 7, 8 and the rubber filling-rings 9 are softened in the process, and when cold it adheres to the wires 5 and 6.

The transverse wire 6 imparts great strength to the shoe, and protects the tread of the tire from being punctured by anything larger than a tack.

The vulcanized rubber rings 9 have at least three functions: First and obviously, they constitute fillers for the otherwise empty annular spaces within the loops of the wound-wire; also, they positively hold and retain the two ring-wires in position whether the shoe is on or off a tire; further, said rubber rings prevent, or tend to prevent, friction and heating between the ring-wires and the said wire loops.

To attach this device to a tire, the tire is deflated to permit one of the beads 4 to be slipped over the tire to its inner side. When the tire is inflated, the stretching of the median zone of the shoe draws the side walls 3 with great pressure upon the walls of the tire, causing the beads 4 to fit so closely that water can not enter between the tire and the shoe.

Having described my invention, I claim as new and desire to secure by Letters Patent:

1. An annular tire-protector of curved transverse section, and comprising a rubber body having a tread and a pair of lateral beads; ring-wires embedded in the beads, a wound wire embedded in the rubber body and looped around the ring-wires, a pair of rubber filling-rings vulcanized within the loops of said wound-wire and against the respective ring-wires, and a fabric strip spirally wound around said wound wire, said strip also being embedded in the rubber body; substantially as described.

2. An annular tire-protector of curved transverse section, and comprising a rubber body having a tread and a pair of lateral beads; the side walls of the body increasing in thickness gradually toward said beads; ring-wires embedded in said beads, a wire wound in a flattened coil, looped around the ring-wires and embedded in the rubber body, a pair of rubber filling-rings vulcanized within the loops of said wound-wire and against the respective ring-wires, and a fabric strip wrapped spirally around said wound wire, said strip also being embedded in the rubber body; substantially as described.

BERT E. BREITWEISER.

Witnesses:
M. Y. CHARLES,
W. A. NETHERCOT.